G. WEBER.
CHUCK FOR HOLDING WORK PIECES.
APPLICATION FILED OCT. 3, 1914.
1,141,594.
Patented June 1, 1915.
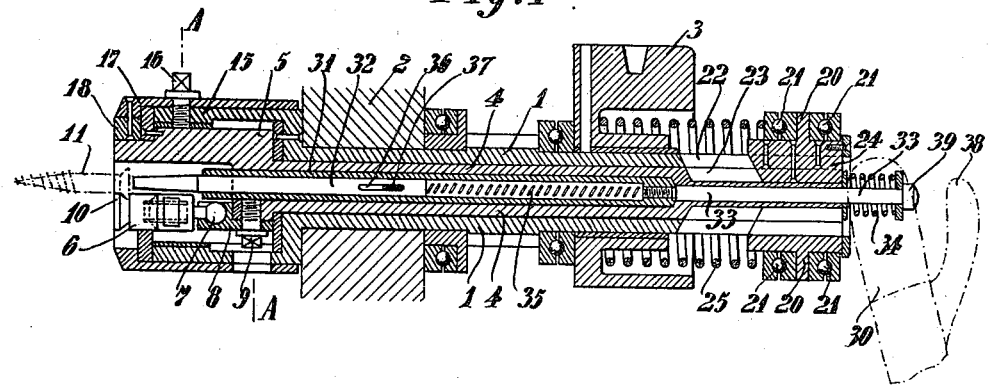
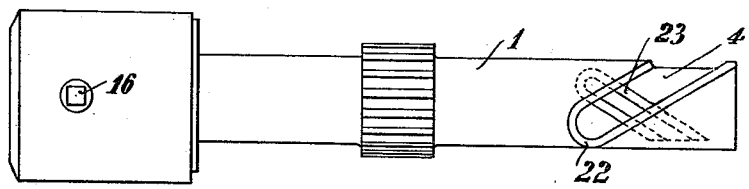
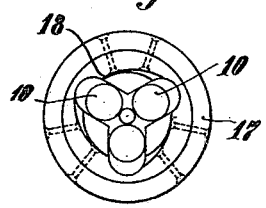 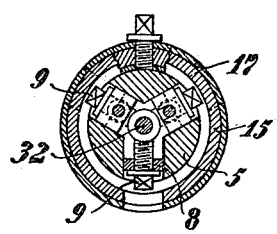
Witnesses:
Helen Nufer
Albert Nufer
Inventor:
Gustav Weber

UNITED STATES PATENT OFFICE.

GUSTAV WEBER, OF HAGEN, GERMANY.

CHUCK FOR HOLDING WORK-PIECES.

1,141,594. Specification of Letters Patent. Patented June 1, 1915.

Application filed October 3, 1914. Serial No. 864,777.

*To all whom it may concern:*

Be it known that I, GUSTAV WEBER, engineer, a subject of the German Emperor, residing at Hagen, Westphalia, Germany, have invented certain new and useful Improvements in Chucks for Holding Work-Pieces, of which the following is a specification.

This invention relates to a chuck which is particularly adapted for machines for making wood-screws and in which the jaws are opened and closed by means of a revoluble bush or casing arranged co-axially about the axis of the chuck.

The essential feature of this invention is that, in order to open or close the chuck, there is fitted a sliding piece, movable in the direction of its axis, which engages in two grooves in the spindles of the chuck and the casing respectively, said grooves being inclined one to another so that, by moving the sliding piece or actuating block in the axial direction, the spindle of the chuck and the casing are rotated relatively one to the other and the jaws are thereby opened or closed. Consequently the opening or closing of the chuck can be effected in a simple manner even with a high rate of revolution. Further, the back ends of the jaws themselves may be advantageously connected by means of a ball joint to a bearing block which is adjustably fastened to the spindle of the chuck so that said jaws are capable of oscillation. Also, an ejecting rod and a second longitudinally adjustable tube or casing may be fitted in the spindle of the chuck, which tube, on being moved forward, separates the jaws for the purpose of releasing the piece of work, whereupon the latter is ejected by means of the inner rod.

From the foregoing it will be seen that this invention has in view three distinct actions in the ejecting operation, first the releasing of the jaws 6 by rotation of the cam pieces 18 and the jaws 6 in reverse directions; second, the opening of the jaws 6 by means of the tube 31 which engages and opens them on moving longitudinally forward; and finally, the positive ejecting or thrusting out of the work by rod or plunger 32 which moves longitudinally forward, these three operations taking place in the above order in very rapid succession.

One constructional form of the chuck is illustrated by way of example in the drawings, wherein:—

Figure 1 is a longitudinal section, Fig. 2 is a plan, Fig. 3 is a front view of the head, the jaws being open, and Fig. 4 is a section on the line A—A of Fig. 1.

Referring to the drawing, 1 is the hollow driving shaft of the machine which is journaled in the fixed bearings 2 and 3, and in the interior of which the actual spindle 4 of the chuck is situated. Said spindle 4 is also hollow, and carries at its front end a head 5 having jaws 6, which are held by means of a ball 7 in a bearing-block 8 and can thereby oscillate. Said bearing-block 8 is fixed to the head 5 of the chuck by means of a screw 9 and is thus adjustable or interchangeable. The free ends of the jaws are provided with projecting edges 10, by means of which they can grip and securely hold the head of the article to be worked 11, for example, a wood-screw as shown in the drawing. The opening and closing of the jaws is effected by means of a revolubly mounted bush or casing 15 which incloses the head 5 of the chuck and is fitted to the front end of the driving shaft 1. The casing 15 is surrounded by a hood 17, which is attached by means of a screw 16, and carries internal cam or eccentric pieces 18 (Figs. 1 and 3), so that if it is rotated relatively to the head 5 of the chuck it actuates the jaws 6 by means of these cam or eccentric edges so as either to close them or set them free.

The rotation of the casing 15 is effected by turning the driving shaft 1 relatively to the spindle 4, To this end a bush 20, which is adjustable longitudinally and also revoluble between ball bearings 21, is fitted to the back end of the driving shaft 1, and the ends of the two spindles 1 and 4 are provided with oblique cross-grooves 22, 23, in which a common sliding-piece or actuating block 24, shaped in conformity with said grooves, engages and is rigidly connected with the bush 20. This sliding-piece or actuating block 24 rotates with the two spindles 1 and 4 and couples them together. A spring 25 in compression, which is supported against the fixed bearing 3, acts on the outer projecting edge of the bush 20 through the agency of a ball bearing 21, and tends to hold the sliding-piece or actuating block 24 in the end position shown in Fig. 1, in which position the rotation of the head of the chuck 5 relative to the casing 15 is such that the jaws 6 are in the closed position. The ball bearing 21 fitted to the outer side of the bush 20 is actuated by a forked, swinging lever 30, so that on swinging this lever forward to the left the sliding piece or actuating block 24 is moved forward against the action of the spring 25 and, owing to the oblique guiding grooves 22, 23, the casing 15 is rotated relatively to the head of the chuck 5, and the jaws 6 are thereby freed for opening by the tube 31 and ejection of the work by rod 32, when a new piece of work may be inserted and the bushing 20 allowed to return to its normal position under the action of spring 25, the spindles 1 and 4 being reversely rotated with relation to each other by piece or actuating block 24 until they assume their normal position and the jaws 6 are closed by the cams 18 on the new piece of work.

Inside the spindle 4 there is arranged another hollow shaft or casing 31, within which is fitted a longitudinally adjustable rod 32 for the purpose of ejecting the finished piece of work. The shaft 31, which is connected with a rod 33, extending out of the spindle 4 and projecting at the back, is usually held in the retracted position shown in Fig. 1 by means of a spring 34 fitted on the outside, while the ejecting rod 32 is held in the advanced position toward the left by means of a spring 35 fitted inside the shaft 31 and is secured in this end position by a cross-pin 37 which engages in a longitudinal slot 36.

The lever 30 which effects the opening of the chuck is provided with an additional arm 38, which is situated opposite the projecting end 39 of the pin 33 so as to leave a certain amount of clearance. By means of this arrangement it is obtained, that on moving the lever 30 forward to the left the sliding-piece 24 is first pushed along the shaft and the jaws of the chuck thereby freed, and then, on further operating the lever 30, the additional arm 38 of which acts on the pin 33, the hollow shaft 31 is moved to the left against the action of the spring 34. Consequently the front edge of the shaft 31 forces the jaws of the chuck apart and the rod 32, owing to the action of the spring 35 ejects the piece of work thus set free toward the front. As soon as a new piece of work is placed in the holder, the lever 30, 38 is moved back to the position shown in Fig. 1 of the drawing, and consequently first the shaft 31 together with the ejecting rod 32 returns and then the jaws are closed by the cam pieces 18, the spindles 1 and 4 being rotated by the action of spring 25 on bushing 20 and sliding piece or actuating block 24. By this means the piece of work can be securely held and again released and ejected in a very simple manner.

What I claim as my invention and desire to secure by Letters Patent is:—

1. In a chuck for holding work-pieces such as wood-screws, the combination of a work-piece holder comprising clamps for the work-piece, a tubular casing surrounding said holder and provided with clamp operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation.

2. In a chuck for holding work-pieces such as wood screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal slots, and axially displaceable means engaging said slots for effecting said relative rotation.

3. In a chunk for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable, spring-controlled means engaging said guides for effecting said relative rotation.

4. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal slots, and a spring-controlled collar axially displaceable on the spindles and having an internal sliding block engaging said slots.

5. In a chuck for holding work-pieces such as wood-screws, the combination of a work-piece holder comprising clamps for the work-piece, a tubular casing surrounding said holder and provided with clamp operating means which normally hold said clamps in their closed position but which release the same when relative rotation between said holder and casing occurs, said holder and casing being carried by concentrically mounted spindles provided with relatively oblique, longitudinal slots, a collar axially displaceable on the spindles, a helical spring coaxial with said spindles and ball-bearings located between said spring and collar.

6. In a chuck for holding work-pieces such as wood-screws, the combination of a work-piece holder comprising removable blocks which carry the clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation.

7. In a chuck for holding work-pieces such as wood-screws, the combination of a work-piece holder comprising removable blocks ball-jointed to the clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation.

8. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; and means for ejecting the work-piece after the release of said clamps.

9. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; means for positively removing the clamps from the work-piece after their release, and means for ejecting the work-piece after removal of the clamps.

10. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; and means comprising an axially displaceable rod mounted within the spindles for ejecting the work-piece after the release of said clamps.

11. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; means comprising an axially displaceable rod mounted within the spindles for removing the clamps from the work-piece after their release, and a second rod axially displaceable in the first rod for ejecting the released work-piece.

12. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; means for ejecting the work-piece after the release of said clamps, and means for actuating, in a single movement, first the said axially displaceable means and then the ejecting means.

13. In a chuck for holding work-pieces such as wood-screws, the combination of a work-piece holder comprising clamps for the work-piece, a tubular casing surrounding said holder and provided with clamp-operating means which normally hold said clamps in their closed position but which release the same when relative rotation between said holder and casing occurs, said holder and casing being carried by concentrically mounted spindles provided with relatively oblique, longitudinal guides, and axially displaceable means engaging said guides for effecting said relative rotation; coaxially mounted means for ejecting the work-piece after the release of said clamps, and a lever having a rear extension, and movable in the direction of the axis of the spindles, said lever in its movement driving the said axially displaceable means before the said extension drives the ejecting means.

In testimony whereof, I have signed my name to this specification in the presence of two subscribing witnesses.

GUSTAV WEBER. [L. S.]

Witnesses:
 HELEN NUFER,
 ALBERT NUFER.

Copies of this patent may be obtained for five cents each, by addressing the "Commissioner of Patents, Washington, D. C."